United States Patent Office.

PATRICK O'HALLORAN, OF NEW YORK, N. Y.

Letters Patent No. 91,659, dated June 22, 1869.

IMPROVED LINIMENT FOR HORSES, &c.

The Schedule referred to in these Letters Patent and making part of the same.

*To all whom it may concern:*

Be it known that I, PATRICK O'HALLORAN, of New York city, in the county and State of New York, have invented a new and improved Liniment for Horses and other Animals; and I do hereby declare that the following is a full, clear, and exact description thereof, which will enable others skilled in the art to make and use the same.

The object of this invention is to provide a healing-liniment for horses and other animals, to be used for cuts, bruises, old sores, and other ailments to which animals are liable.

To this end, I take brown acetate lead, five ounces; alum, ten ounces; bluestone, two ounces, water; six ounces, and mix the same together, forming a compound which I have found, by practical demonstration, to be highly beneficial for use, as above stated, and applicable also, in many cases, as a healing-liniment for the human subject.

Having thus described my invention,

What I claim as new, and desire to secure by Letters Patent, is—

The improved compound, substantially as herein described.

The above specification of my invention signed by me, this 23d day of March, 1869.

PATRICK X O'HALLORAN.
his / mark.

Witnesses:
C. L. TOPLIFF,
FRANK BLOCKLEY.